(12) United States Patent
Murayama et al.

(10) Patent No.: US 9,856,144 B2
(45) Date of Patent: Jan. 2, 2018

(54) NITROUS ACID GENERATOR

(71) Applicant: Panasonic Intellectual Property Management Co., Ltd., Osaka (JP)

(72) Inventors: Hiroko Murayama, Osaka (JP); Tatsushi Ohyama, Gifu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 69 days.

(21) Appl. No.: 14/795,930

(22) Filed: Jul. 10, 2015

(65) Prior Publication Data

US 2016/0039675 A1 Feb. 11, 2016

(30) Foreign Application Priority Data

Aug. 8, 2014 (JP) ................. 2014-162956

(51) Int. Cl.
*C01B 21/50* (2006.01)
*B01J 19/08* (2006.01)
*H05H 1/48* (2006.01)

(52) U.S. Cl.
CPC ............. *C01B 21/50* (2013.01); *B01J 19/088* (2013.01); *H05H 1/48* (2013.01);
(Continued)

(58) Field of Classification Search
CPC ............. C01B 21/50; B01J 19/088; B01J 2219/0809; B01J 2219/0815;
(Continued)

(56) References Cited

U.S. PATENT DOCUMENTS

2010/0219136 A1* 9/2010 Campbell ............. C02F 1/4608
 210/748.01
2011/0240567 A1* 10/2011 Zolezzi-Garreton . C02F 1/4608
 210/748.17
(Continued)

FOREIGN PATENT DOCUMENTS

JP 2007-077665 3/2007
JP 2007-077666 3/2007
(Continued)

*Primary Examiner* — Xiuyu Tai
(74) *Attorney, Agent, or Firm* — McDermott Will & Emery LLP

(57) ABSTRACT

A nitrous acid generator includes a treatment vessel having an inner space being capable of holding a liquid; a gas supplier supplying a gas to the inner space such that the gas forms a bubble in the liquid, the gas containing oxygen and nitrogen; a plasma generator including a first electrode, a second electrode, and a power supply for applying a voltage therebetween, the plasma generator generating plasma in the bubble, the plasma producing nitrogen oxide including nitrogen monoxide and nitrogen dioxide; a gas-liquid contact member to which the nitrogen oxide and the liquid are introduced from the treatment vessel, the gas-liquid contact member causing the nitrogen oxide to be dissolved in the liquid while the nitrogen oxide and the liquid pass through the gas-liquid contact member; and a cooler cooling the nitrogen oxide and the liquid while the nitrogen oxide and the liquid pass through the gas-liquid contact member.

17 Claims, 14 Drawing Sheets

(52) U.S. Cl.
CPC .. *B01J 2219/083* (2013.01); *B01J 2219/0809* (2013.01); *B01J 2219/0815* (2013.01); *B01J 2219/0841* (2013.01); *B01J 2219/0869* (2013.01); *B01J 2219/0871* (2013.01); *B01J 2219/0883* (2013.01); *B01J 2219/0894* (2013.01)

(58) Field of Classification Search
CPC .......... B01J 2219/083; B01J 2219/0841; B01J 2219/0869; B01J 2219/0871; B01J 2219/0883; B01J 2219/0864; H05H 1/48; C02F 1/4608; C02F 1/46109; C02F 2001/46171; C02F 2201/4619
See application file for complete search history.

(56) References Cited

U.S. PATENT DOCUMENTS

| | | | | |
|---|---|---|---|---|
| 2014/0054242 | A1* | 2/2014 | Imai | C02F 1/4608 210/748.17 |
| 2015/0239759 | A1* | 8/2015 | Kang | C02F 1/72 210/748.17 |

FOREIGN PATENT DOCUMENTS

| | | |
|---|---|---|
| JP | 2010-188228 | 9/2010 |
| JP | 2014-079743 | 5/2014 |
| WO | WO2012/157034 | * 12/2012 |
| WO | 2014/188725 | 11/2014 |

\* cited by examiner

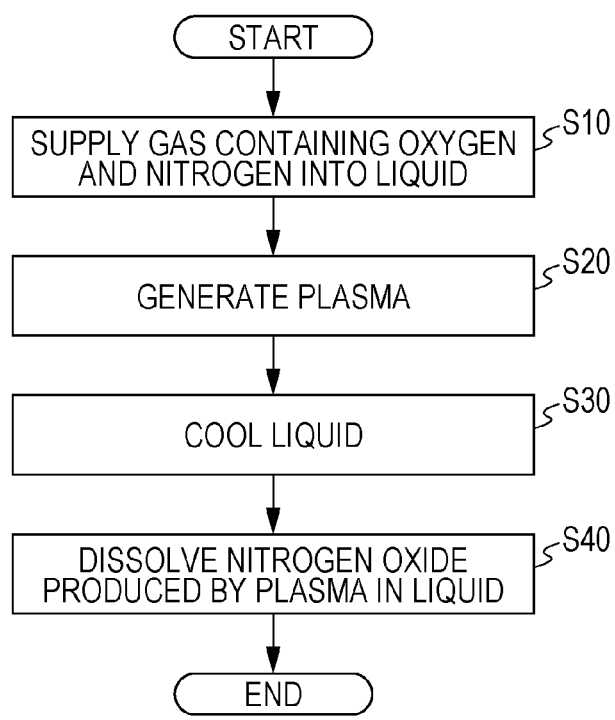

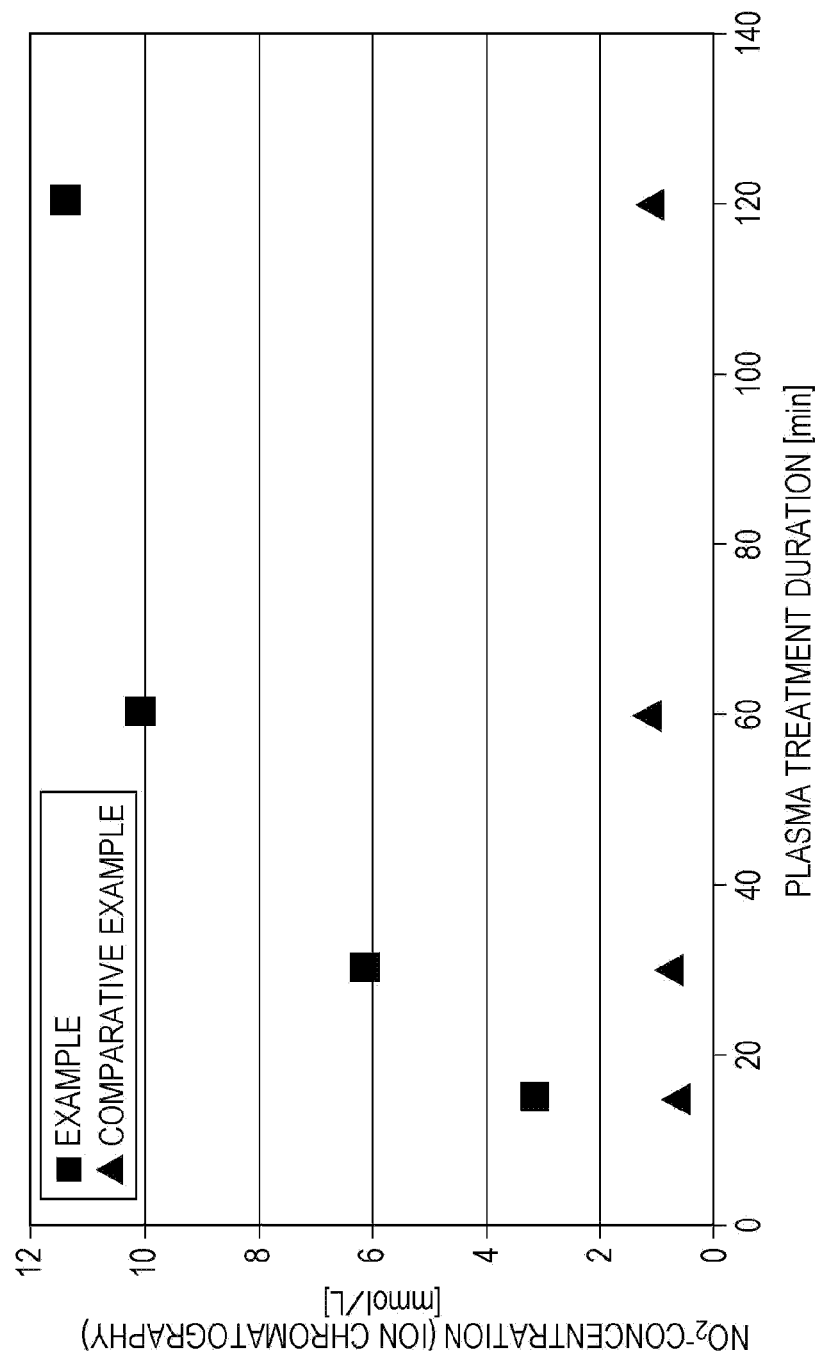

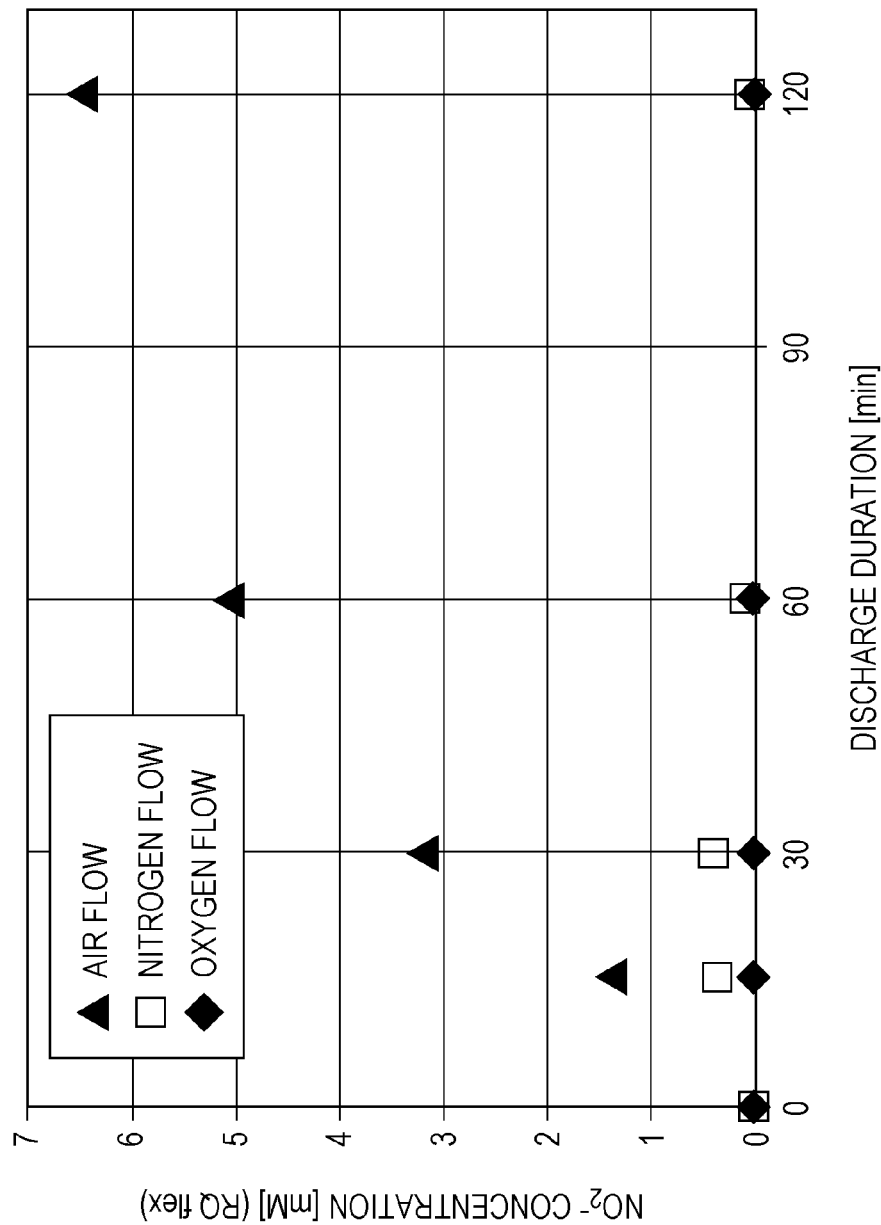

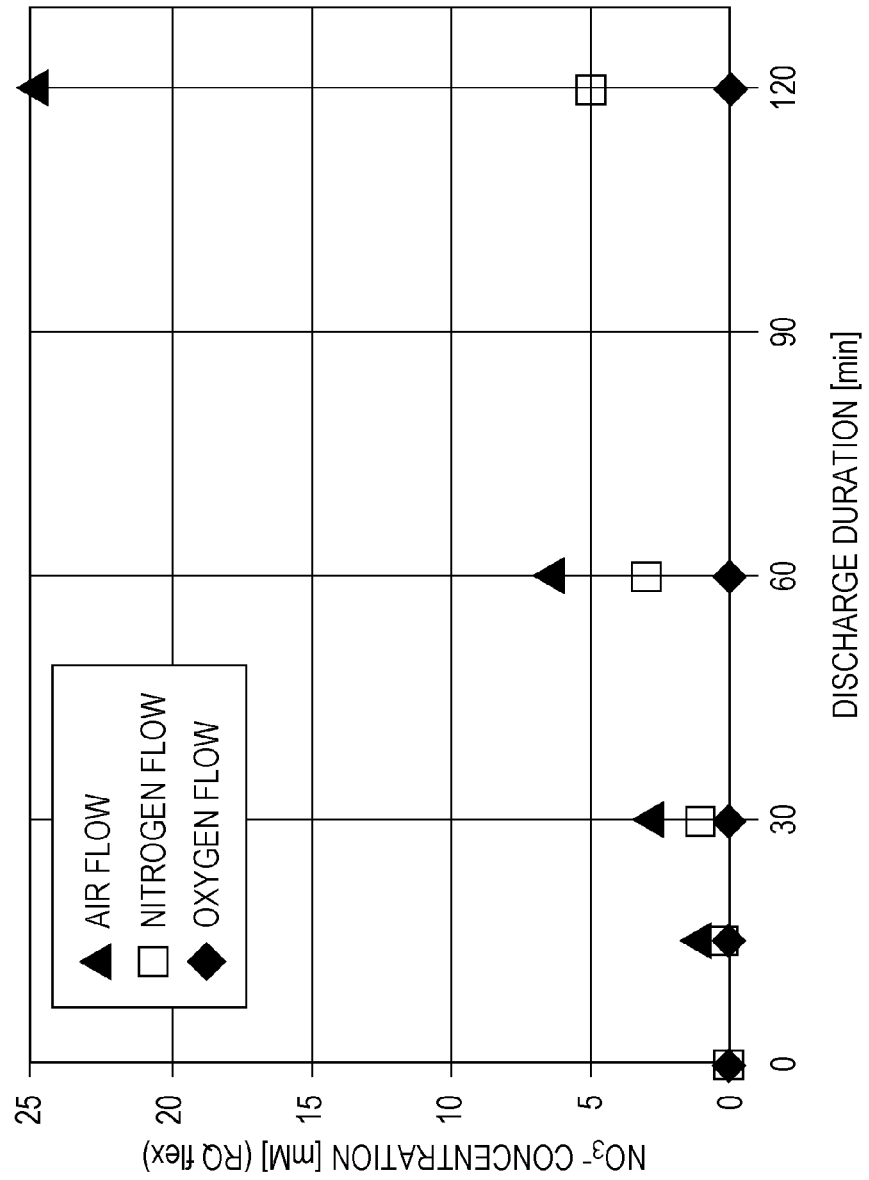

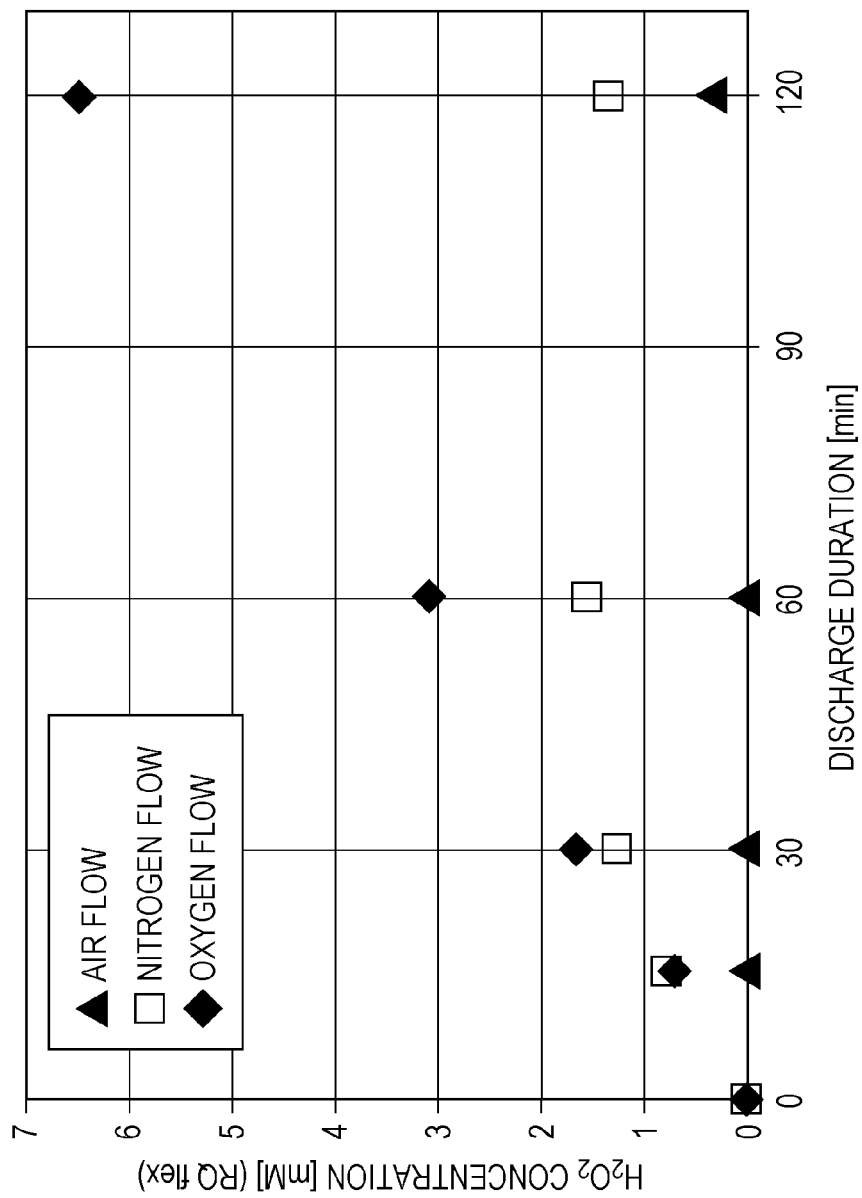

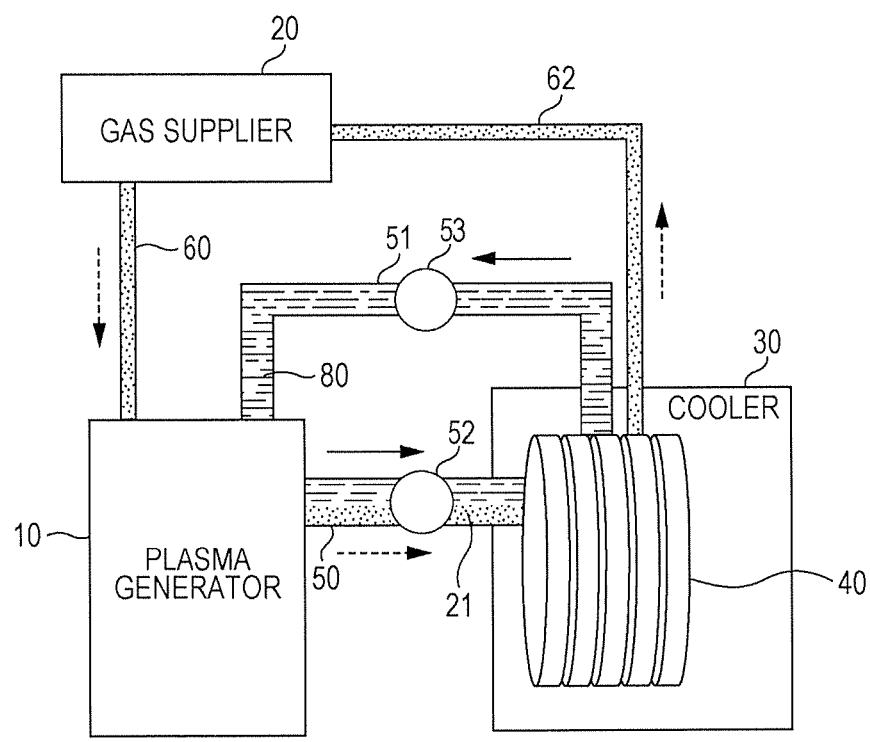

NITROUS ACID GENERATOR

BACKGROUND

1. Technical Field

The present disclosure relates to a nitrous acid generator.

2. Description of the Related Art

It has been common practice to generate an aqueous solution of nitrous acid, for example, for use as a cleaning solution (see Japanese Unexamined Patent Application Publication No. 2007-77666, for example).

In the technique described in Japanese Unexamined Patent Application Publication No. 2007-77666, nitrogen oxide gas including nitrogen monoxide and nitrogen dioxide is produced by electric discharge in air. The nitrogen oxide, which is produced in air, is bubbled through the liquid to form a solution.

SUMMARY

One non-limiting and exemplary embodiment provides a nitrous acid generator that efficiently generates highly concentrated nitrous acid.

In one general aspect, the techniques disclosed here feature a nitrous acid generator including: a treatment vessel having an inner space being capable of holding a liquid; a gas supplier supplying a gas to the inner space such that the gas forms a bubble in the liquid, the gas containing oxygen and nitrogen; a plasma generator including a first electrode, a second electrode, and a power supply for applying a voltage between the first electrode and the second electrode, the plasma generator generating plasma in the bubble, the plasma producing nitrogen oxide including nitrogen monoxide and nitrogen dioxide; a gas-liquid contact member to which the nitrogen oxide and the liquid are introduced from the treatment vessel, the gas-liquid contact member causing the nitrogen oxide to be dissolved in the liquid while the nitrogen oxide and the liquid pass through the gas-liquid contact member; and a cooler cooling the nitrogen oxide and the liquid while the nitrogen oxide and the liquid pass through the gas-liquid contact member.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is an operation flow chart of the nitrous acid generator of the embodiment;

FIG. 5 is a diagram showing a relationship between plasma treatment duration and nitrite ion concentration in the nitrous acid generator of the embodiment;

FIG. 7A is a diagram showing a relationship between discharge duration and a nitrite ion concentration according to each of three different gases in the nitrous acid generator of the embodiment;

FIG. 7B is a diagram showing the relationship between discharge duration and a nitrate ion concentration according to each of three different gases in the nitrous acid generator of the embodiment;

FIG. 7C is a diagram showing a relationship between discharge duration and a hydrogen peroxide concentration according to each of three different gases in the nitrous acid generator of the embodiment;

FIG. 10 is a view illustrating a configuration of a nitrous acid generator in a first modification of the embodiment.

DETAILED DESCRIPTION

Brief Description of Present Disclosure

Figure 1:
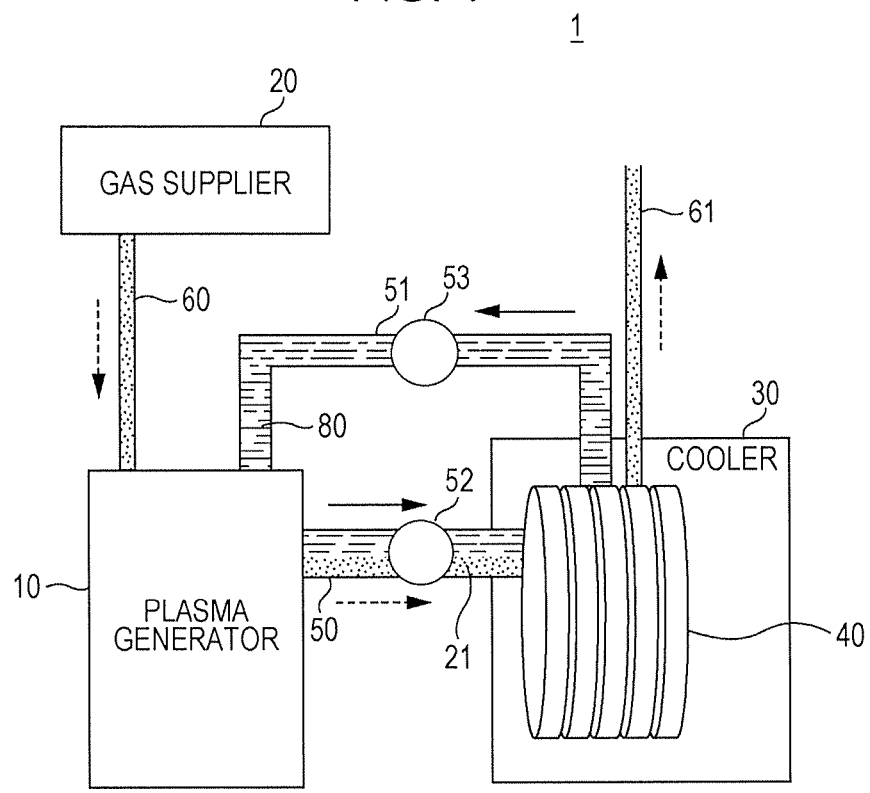
FIG. 1 is a view illustrating a configuration of a nitrous acid generator of an embodiment.

In the technique disclosed in Japanese Unexamined Patent Application Publication No. 2007-77666, nitrogen oxide, which is produced in air, is bubbled with air through liquid, and thus the nitrogen oxide concentration in a bubble is low. As a result, the nitrogen oxide dissolves less efficiently in the liquid, and highly concentrated nitrous acid is not produced efficiently.

To solve the problem, a nitrous acid generator according to one aspect of the present disclosure includes a treatment vessel having an inner space being capable of holding a liquid; a gas supplier supplying a gas to the inner space such that the gas forms a bubble in the liquid, the gas containing oxygen and nitrogen; a plasma generator including a first electrode, a second electrode, and a power supply for applying a voltage between the first electrode and the second electrode, the plasma generator generating plasma in the bubble, the plasma producing nitrogen oxide including nitrogen monoxide and nitrogen dioxide; a gas-liquid contact member to which the nitrogen oxide and the liquid are introduced from the treatment vessel, the gas-liquid contact member causing the nitrogen oxide to be dissolved in the liquid while the nitrogen oxide and the liquid pass through the gas-liquid contact member; and a cooler cooling the nitrogen oxide and the liquid while the nitrogen oxide and the liquid pass through the gas-liquid contact member.

With this configuration, plasma is generated in the bubble formed in the liquid, and thus nitrogen oxide is produced in the bubble. The nitrogen oxide produced in the bubble is surrounded by the liquid. Thus, the nitrogen oxide concentration increases due to the pressure of the liquid surrounding the nitrogen oxide, and thus the nitrogen oxide dissolves efficiently in the liquid. In addition, since the nitrous acid generator according to this aspect includes the gas-liquid contact member, the nitrogen oxide dissolves more efficiently in the liquid.

When the nitrogen oxide dissolves in the liquid, nitrite ions are generated. However, nitrite ions readily convert to nitrate ions at high temperatures. The cooler in the embodiment reduces the likelihood that the nitrite ions will be converted to nitrate ions. According to this aspect, highly concentrated nitrous acid is produced efficiently.

In the nitrous acid generator, the gas-liquid contact member may include a tube. A ratio of a length of the tube to an inner diameter of the tube may be 50 or more. With this configuration, more nitrogen oxide is able to dissolve in the liquid.

In the nitrous acid generator, the gas-liquid contact member may include at least one of a filter and a porous film that increase a contact area between the nitrogen oxide and the liquid. With this configuration, more nitrogen oxide is able to dissolve in the liquid.

The nitrous acid generator may further include a pump that moves the nitrogen oxide and the liquid in the treatment vessel to the gas-liquid contact member.

In addition, the liquid that has passed through the gas-liquid contact member may include nitrite ions, for example. An aqueous solution of nitrous acid that contains the nitrite ions is generated since the nitrogen oxide dissolves in the liquid due to the gas-liquid contact member.

The gas supplier may supply a part of the nitrogen oxide with the gas, the part not being dissolved in the liquid while the nitrogen oxide and the liquid pass through the gas-liquid contact member and being collected.

With this configuration, more nitrogen oxide is able to dissolve in the liquid since the residual nitrogen oxide, which remains without dissolving in the liquid, is supplied again. According to this aspect, highly concentrated nitrous acid is produced more efficiently.

The nitrous acid generator may further include a pump that returns at least a part of the liquid passed through the gas-liquid contact member to the treatment vessel.

With this configuration, more nitrogen oxide is able to dissolve in the liquid since at least a part of the liquid circulates between the treatment vessel in which the plasma generator is disposed and the gas-liquid contact member. According to this aspect, highly concentrated nitrous acid is produced more efficiently.

A method of generating nitrous acid according to another aspect of the present disclosure includes supplying a gas containing oxygen and nitrogen into a liquid to form a bubble, generating plasma in the liquid to produce nitrogen oxide in the liquid, cooling the liquid, and causing the nitrogen oxide in the liquid to be dissolved in the liquid.

As in the above-described nitrous acid generator, highly concentrated nitrous acid is produced more efficiently by this method.

Hereinafter, embodiments are described in detail with reference to the drawings.

The embodiments described below provide general or specific examples. Numbers, shapes, materials, components, positions and connection of the components, process steps, and order of the steps described in the following embodiments are examples. The present disclosure is not limited to the embodiments. The components of the following embodiments that are not included in an independent claim which constitutes the broadest concept of the present disclosure are optional.

Embodiments

1. Nitrous Acid Generator

A configuration of a nitrous acid generator of an embodiment is described with reference to FIG. 1 to FIG. 3B.

Figure 2:
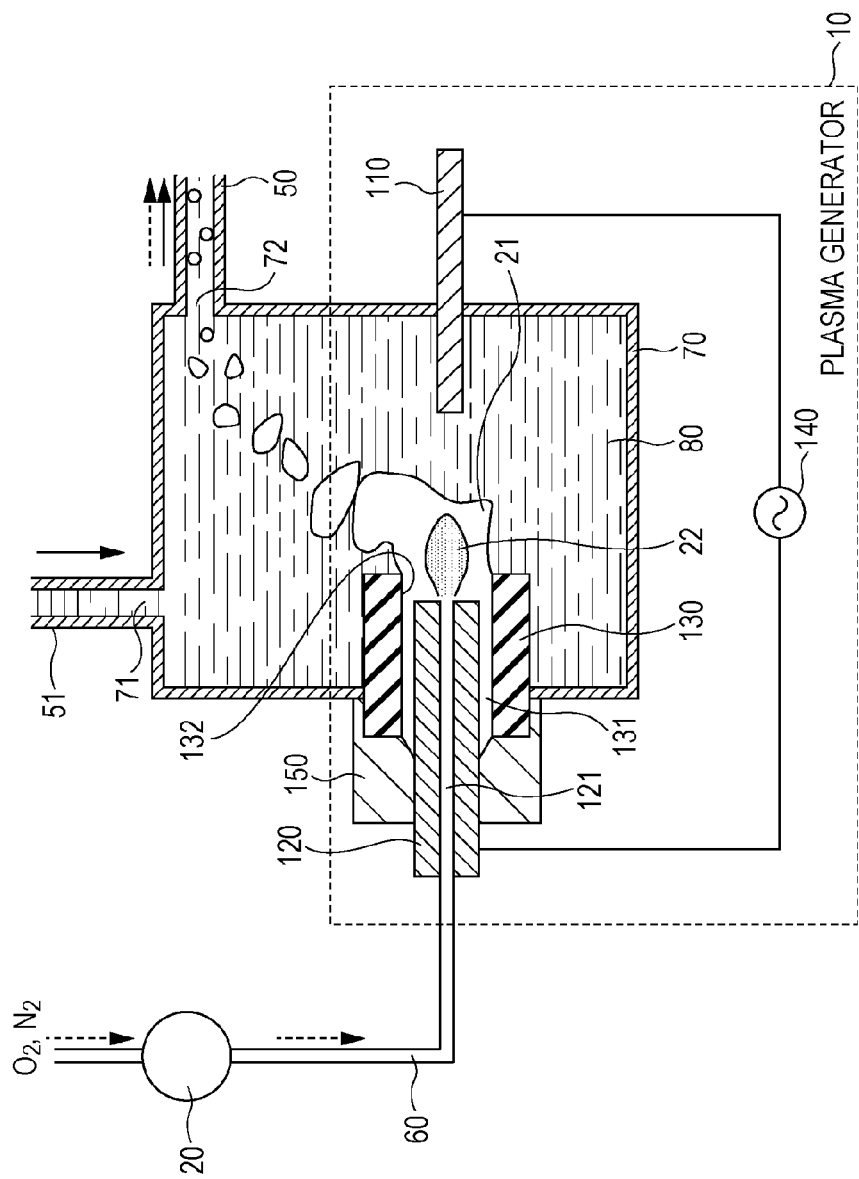
FIG. 2 is a view illustrating a configuration of a plasma generator of the embodiment.
Figure 3A:
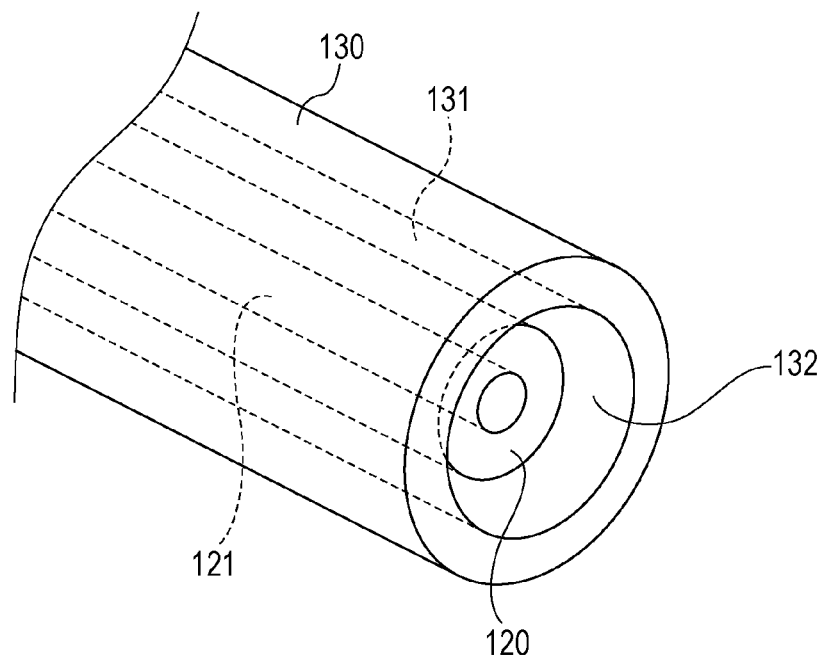
FIG. 3A is a perspective view illustrating a second electrode and an insulator of the plasma generator of the embodiment.
Figure 3B:
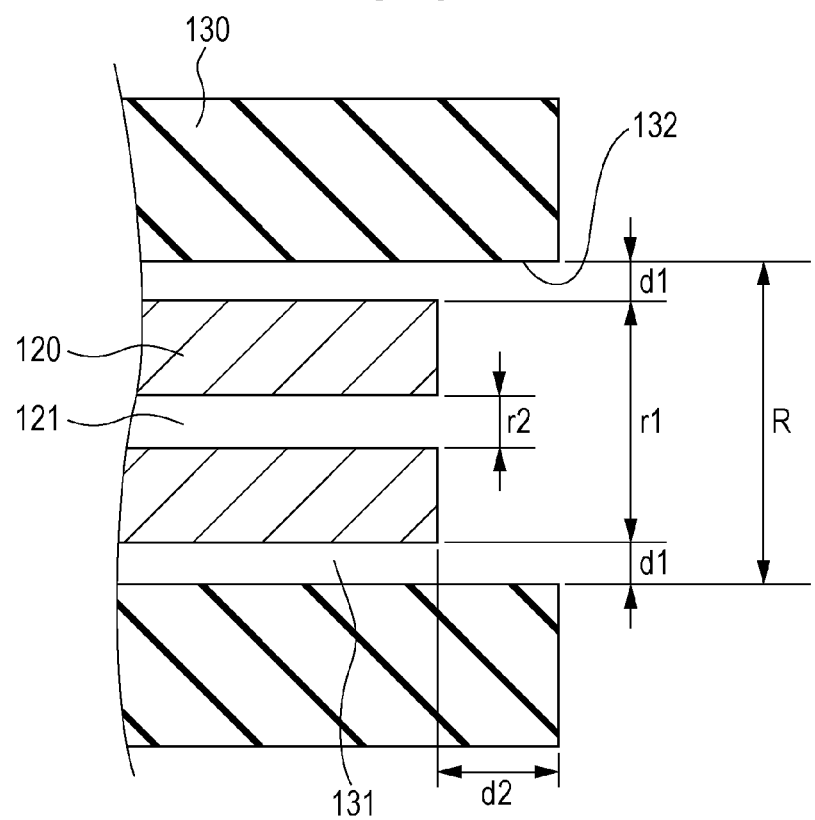
FIG. 3B is a cross-sectional view illustrating the second electrode and the insulator of the plasma generator of the embodiment.

FIG. 1 illustrates a configuration of a nitrous acid generator 1 of the embodiment. FIG. 2 illustrates a configuration of a plasma generator 10 of the embodiment. FIG. 3A and FIG. 3B are a perspective view and a cross-sectional view, respectively, each illustrating a second electrode 120 and an insulator 130 of the plasma generator 10 of the embodiment.

In the nitrous acid generator 1 of the embodiment, plasma is generated in a bubble formed in liquid to produce nitrogen oxide consisting of at least nitrogen monoxide (NO) and nitrogen dioxide ($NO_2$). In the nitrous acid generator 1, the nitrogen oxide is allowed to dissolve in the liquid to produce nitrous acid ($HNO_2$).

As illustrated in FIG. 1 and FIG. 2, the nitrous acid generator 1 includes the plasma generator 10, a gas supplier 20, a cooler 30, a gas-liquid contact member 40, pipes 50 and 51, a gas inlet pipe 60, a gas outlet pipe 61, and a treatment vessel 70. In FIG. 1 and FIG. 2, a solid arrow indicates a flow direction of liquid 80 and a broken arrow indicates a flow direction of gas or gas bubble 21.

Hereinafter, each of the components is described in detail.

1-1. Plasma Generator

The plasma generator 10 generates plasma 22 in the gas bubbles 21 formed by the gas supplier 20 to produce nitrogen oxide in the liquid 80. Specifically, as illustrated in FIG. 2, the plasma generator 10 generates the plasma 22 in the gas bubbles 21 formed in the liquid 80 held in the treatment vessel 70. The plasma generator 10 also generates active species such as OH radicals together with the plasma 22 and supplies such generated OH radicals in the liquid 80.

As illustrated in FIG. 2, the plasma generator 10 includes a first electrode 110, a second electrode 120, an insulator 130, a power supply 140, and a holding block 150.

1-1-1. First Electrode

The first electrode 110 is one of two electrodes included in the plasma generator 10. The first electrode 110 is connected to the power supply 140.

The first electrode 110 is a rod-shaped electrode, for example. Specifically, the first electrode 110 has a cylindrical shape. The diameter of the first electrode 110 is smaller than a predetermined value to reduce the size of the plasma generator 10. The diameter of the first electrode 110 is 2 mm or less, for example.

In the embodiment, at least a part of the first electrode 110 is positioned in the treatment vessel 70. Specifically, the first electrode 110 is positioned to be in contact with the liquid 80. In FIG. 2, a tip of the first electrode 110 faces a tip of the second electrode 120. However, the arrangement of the first electrode 110 is not limited to this. The first electrode 110 and the second electrode 120 may be arranged side-by-side.

The first electrode 110 may be made of a conductive metal material such as tungsten, copper, aluminum, or iron.

The first electrode 110 may have a prism shape. The first electrode 110 may not have a cylindrical shape or a prism shape and may have a tubular shape or a planar shape. In addition, the first electrode 110 may be fixed to a surface of the treatment vessel 70 or may be detachably attached to the surface of the treatment vessel 70.

1-1-2. Second Electrode

The second electrode 120 is the other electrode included in the plasma generator 10 and is a tubular electrode having a hollow portion 121. The second electrode 120 is connected to the power supply 140.

In the embodiment, as illustrated in FIG. 3A, the second electrode 120 has a tubular shape. Specifically, an outer diameter of the second electrode 120, which is represented by "r1" in FIG. 3B, is smaller than a predetermined value to reduce the size of the plasma generator 10. The outer diameter r1 of the second electrode 120 is 2 mm or less, for example, and is 2 mm as an example.

The second electrode 120 is surrounded by the insulator 130. The second electrode 120 and the insulator 130 define a gap 131 therebetween. The second electrode 120 is held by the holding block 150.

The second electrode 120 is positioned such that one end (tip) thereof is to be in contact with the liquid 80 and the other end (base) thereof is connected to the gas supplier 20 via the gas inlet pipe 60. The gas supplied from the gas supplier 20 flows through the hollow portion 121 of the second electrode 120 into the gap 131 via the tip of the second electrode 120. The gas that has flowed into the gap 131 surrounds the second electrode 120. Furthermore, the gas is expelled into the liquid 80 through an opening 132 of the insulator 130 in the form of a gas bubble 21. When gas is not supplied, the tip of the second electrode 120 is surrounded by the liquid 80. When the gas is supplied, the tip of the second electrode 120 is surrounded by the gas bubble 21 and is not in contact with the liquid 80.

The second electrode 120 is used as a reaction electrode and the plasma 22 is generated around it. The plasma 22 is present in the gas bubble 21. Generation of the plasma 22 results in the formation of, for example, nitrogen oxide and OH radicals in the gas bubble 21. The produced nitrogen oxide is sent from the treatment vessel 70 together with the liquid 80 to the gas-liquid contact member 40 through the pipe 50 while a part of the nitrogen oxide is dissolving in the liquid 80.

The second electrode 120 may be made of a conductive metal material such as a plasma-resistant metal material. Specifically, the second electrode 120 is made of tungsten. The second electrode 120 may be made of any other plasma-resistant metal material or may be made of copper, aluminum, iron, or an alloy of these metals, although resistance of the second electrode 120 may be reduced.

In addition, yttrium oxide doped with a conductive material may be sprayed onto a part of a surface of the second electrode 120. The conductive material may be yttrium metal, for example, and such a conductive material provides a conductivity of 1 to 30 Ωcm. Such an yttrium oxide coating lengthens the service life of the electrode.

The hollow portion 121 is a through hole extending through the second electrode 120 in the axial direction. The diameter of the hollow portion 121 (an inner diameter of the second electrode 120, which is represented by "r2" in FIG. 3B) is 0.9 mm or less, for example, and is 0.3 mm as an example. The hollow portion 121 may further have one or more through holes that extend through a side of the second electrode 120.

The second electrode 120 may have a rectangular tubular shape. In addition, a cross section of the hollow portion 121, which is taken perpendicular to the axial direction, is not limited to the circular shape, and may be elliptical or rectangular.

1-1-3. Insulator

The insulator 130 surrounds the second electrode 120. The insulator 130 and the second electrode 120 define the gap 131 therebetween. The gap 131 is in communication with the hollow portion 121. The insulator 130 includes the opening 132 through which the space outside the insulator 130 and the gap 131 are in communication with each other.

The insulator 130 electrically insulates the second electrode 120 from the liquid 80. The second electrode 120 is in contact with the liquid 80 in actual use, since the liquid 80 flows into the insulator 130 through the opening 132. When the gas is supplied by the gas supplier 20, the gas blocks the opening 132 and the second electrode 120 is electrically insulated from the liquid 80.

As illustrated in FIG. 3A, the insulator 130 has a tubular shape, for example. The second electrode 120 is disposed in a hole of the insulator 130 such that the axial direction of the second electrode 120 and the axial direction of the insulator 130 are parallel to each other. Specifically, the insulator 130 and the second electrode 120 are arranged such that the axis of the second electrode 120 is coincident with the axis of the insulator 130.

The inner diameter of the insulator 130, which is a diameter of the opening 132 and is represented by "R" in FIG. 3B, is 3 mm or less, for example, and is 2 mm as an example. The thickness of the insulator 130 is not particularly limited, but may be 1 mm or less to reduce the size of the plasma generator 10.

The insulator 130 is made of alumina ceramic, for example, but may be made of magnesia, quartz, or yttrium oxide.

The gap 131 is a so-called micro gap. The dimension of the gap 131, which is represented by "d1" in FIG. 3B, is determined based on electron temperature and a reduced electric field of plasma and density of the gas. The gap d1 is 0.5 mm or less, for example.

The tip of the second electrode 120 is positioned inward from the end surface of the insulator 122 by a predetermined distance, which is represented by d2 in FIG. 3B. The distance "d2" is less than 7 mm, for example, and is desirably 3 mm or more and 5 mm or less.

Since the tip of the second electrode 120 is positioned inward from the end surface of the insulator 122, the gas discharged from the front end of the hollow portion 121 flows not only into the treatment vessel 70 through the opening 132, but also readily into the gap 131. The gap 131 filled with the gas can cause electric discharge in the gap 131 when a voltage is applied.

The shape of the insulator 130 is not limited to a tubular shape, but may be a rectangular tubular shape. In addition, although the insulator 130 is held by the holding block 150 in this embodiment, the insulator 130 may be fixed to the surface of the treatment vessel 70 or may be detachably attached to the surface of the treatment vessel 70.

1-1-4. Power Supply

The power supply 140 generates a predetermined voltage between two electrodes. In the embodiment, the power supply 140 applies a pulse voltage or an AC voltage between the first electrode 110 and the second electrode 120.

The predetermined voltage is a negative high voltage pulse in a range of 2 kV/cm to 50 kV/cm at 1 Hz to 100 kHz. A voltage waveform may be any one of a pulse wave, a half sine wave, and a sine wave, for example. Current flowing between the two electrodes is 1 mA to 3 A, for example. Specifically, the power supply 140 applies a pulse voltage having a peak voltage of 4 kV, a pulse width of 1 µs, and a frequency of 30 kHz. An input power by the power supply 140 is 30 W, for example.

1-1-5. Holding Block

The holding block 150 holds the second electrode 120 and the insulator 130. The holding block 150 is fixed to the treatment vessel 70, for example. The holding block 150 may be formed integrally with the treatment vessel 70 or may be formed separately from the treatment vessel 70.

1-2. Gas Supplier

The gas supplier 20 supplies gas containing oxygen ($O_2$) and nitrogen ($N_2$) into the liquid 80 to form a gas bubble 21. In the embodiment, the gas supplier 20 supplies the gas to an area around the second electrode 120. Specifically, the gas supplier 20 supplies the gas into the hollow portion 121 such that the gas is supplied into the liquid 80 through the gap 131 and the opening 132, whereby the gas bubble 21 is formed. The gas supplier 20 is a pump, for example.

The gas containing oxygen and nitrogen is atmospheric air, for example. The gas supplier 20 collects surrounding air and supplies the air into the liquid 80, for example.

The gas supplied into the liquid 80 blocks the opening 132 of the insulator 130. In other words, the gas bubble 21 forms a "gas wall". This prevents the first electrode 110 and the second electrode 120 from forming a current path through the liquid 80. As a result, when a voltage is applied between the first electrode 110 and the second electrode 120, electric discharge occurs in the gas bubble 21 and forms the plasma 22.

1-3. Cooler

The cooler 30 cools the liquid 80 passing through the gas-liquid contact member 40. In the embodiment, the cooler 30 cools the gas-liquid contact member 40 to cool the liquid 80 passing through the gas-liquid contact member 40. The cooler 30 cools the liquid 80 to a temperature of 5 to 20° C., for example. The cooler 30 cools the liquid 80 to maintain the temperature of the liquid 80 at 10° C., for example. The cooler 30 may be an air-cooling type or water-cooling type.

Nitrite ions ($NO_2^-$) dissolved in the liquid 80 convert to nitrate ions ($NO_3^-$) when the temperature of the liquid 80 is high. The cooler 30 maintains the temperature of the liquid 80 at a low temperature to prevent the nitrite ions from converting to nitrate ions.

The cooler 30 may cool the treatment vessel 70 in which the plasma generator 10 is disposed. Alternatively, the cooler 30 may cool the pipes 50 and 51 through which the liquid 80 flows. In short, the cooler 30 may cool at least one of the treatment vessel 70, the pipes 50 and 51, and the gas-liquid contact member 40.

1-4. Gas-Liquid Contact Member

The gas-liquid contact member 40 allows the liquid 80 after the generation of the plasma 22 to pass therethrough such that the nitrogen oxide produced in the liquid 80 dissolves in the liquid 80. Specifically, the gas-liquid contact member 40 increases the contact area between the nitrogen oxide produced in the liquid 80 and the liquid 80 and the contact time of the nitrogen oxide produced in the liquid 80 with the liquid 80.

The gas-liquid contact member 40 allows the liquid 80 to pass therethrough such that 13% or more, for example, of the total volume of the nitrogen monoxide and the nitrogen dioxide, which is measured immediately before contact with the gas-liquid contact member 40, is dissolved in the liquid 80.

The gas-liquid contact member 40 is a long tube such as a hose or a pipe, for example. Specifically, the gas-liquid contact member 40 is a wound-up hose. The nitrogen oxide dissolves in the liquid 80 while the liquid 80 is flowing through the gas-liquid contact member 40 that is in the form of the hose. The hose enables the liquid 80 to be in contact with the nitrogen oxide for a longer time, and thus more nitrogen oxide dissolves in the liquid 80. The ratio of the length of the tube to the inner diameter of the tube is 50 or more, for example. Since the ratio is 50 or more, the gas containing the nitrogen oxide is in contact with the liquid 80 for a long time. As a result, a sufficient amount of nitrous acid is produced.

Alternatively, the gas-liquid contact member 40 may include a filter that increases the contact area between the nitrogen oxide and the liquid 80. The gas-liquid contact member 40 may include a porous film, for example. The filter or the porous film allows the gas containing the nitrogen oxide that has passed therethrough to be finer, and thus the contact area between the gas and the liquid 80 increases. As a result, a sufficient amount of nitrous acid is produced.

The gas-liquid contact member 40 is connected to the treatment vessel 70, in which the plasma generator 10 is disposed, through the pipes 50 and 51. In the embodiment, as illustrated in FIG. 1 and FIG. 2, the gas-liquid contact member 40 is connected to the treatment vessel 70 through the pipes 50 and 51 so as to form a circulation path of the liquid 80 between the gas-liquid contact member 40 and the treatment vessel 70.

Specifically, one end of the gas-liquid contact member 40 is connected to an outlet 72 of the treatment vessel 70 via the pipe 50. The other end of the gas-liquid contact member 40 is connected to an inlet 71 of the treatment vessel 70 via the pipe 51. The liquid 80 flows through the treatment vessel 70, the pipe 50, the gas-liquid contact member 40, and the pipe 51 in this order.

Nitrous acid is produced when the nitrogen oxide dissolves in the liquid 80 and the liquid 80 becomes acidic. Therefore, the gas-liquid contact member 40 is desirably made of an acid-resistant material, for example. The gas-liquid contact member 40 may be made of a resin material such as polyvinyl chloride, a metal material such as stainless steel, or ceramic, for example.

1-5. Pipe

The pipes 50 and 51 form the circulation path of the liquid 80.

The pipe 50 connects the outlet 72 of the treatment vessel 70 with the one end of the gas-liquid contact member 40. The pipe 50 supplies the liquid 80 in which the plasma 22 is generated by the plasma generator 10 to the gas-liquid contact member 40. The gas bubble 21 containing the nitrogen oxide produced by the plasma generator 10 flows through the pipe 50 with the liquid 80.

The pipe 51 connects the inlet 71 of the treatment vessel 70 with the other end of the gas-liquid contact member 40. The pipe 51 allows at least a part of the liquid 80 that has passed through the gas-liquid contact member 40 to return to the treatment vessel 70. The liquid 80 that has passed through the gas-liquid contact member 40, i.e., the liquid 80 including the nitrogen oxide and a high quantity of nitrite ions, flows through the pipe 51.

The pipes 50 and 51 are made of a material having high acid-resistance. The pipes 50 and 51 may be made of a resin material such as polyvinyl chloride, a metal material such as stainless steel, or ceramic, for example.

The pipes 50 and 51 are provided with liquid movement devices such as pumps 52 and 53, respectively, to circulate the liquid 80.

1-6. Gas Inlet Pipe and Gas Outlet Pipe

The gas inlet pipe 60 allows the gas containing oxygen and nitrogen to pass therethrough. The gas inlet pipe 60 connects the gas supplier 20 with the plasma generator 10. With this configuration, the gas containing the oxygen and the nitrogen can be delivered from the gas supplier 20 to an area around the second electrode 120 of the plasma generator 10 through the gas inlet pipe 60.

The gas outlet pipe 61 allows the residual nitrogen oxide, which remains in the liquid 80 that has passed through the gas-liquid contact member 40 without dissolving in the liquid 80, to be discharged.

Both the gas inlet pipe 60 and the gas outlet pipe 61 are made of a material inert to oxygen and nitrogen. The material of the gas outlet pipe 61 is further inert to nitrogen oxide. The gas inlet pipe 60 and the gas outlet pipe 61 may be made of the same material as the pipes 50 and 51.

1-7. Treatment Vessel

The treatment vessel 70 is a container for holding the liquid 80 and may have any size and shape. In FIG. 2, the treatment vessel 70 is a tank as an example. However, the treatment vessel 70 is not limited thereto and may be a thin pipe that constitutes a portion of the pipes, for example.

The treatment vessel 70 has an inlet 71 and an outlet 72. The treatment vessel 70 is made of a high acid-resistant material. The treatment vessel 70 may be made of the same material as the pipes 50 and 51, for example.

The liquid 80 is water (purified water or tap water), for example, but is not limited thereto.

2. Operation

Next, operation of the nitrous acid generator 1 in this embodiment is described with reference to FIG. 4.

FIG. 4 is a flow chart indicating operation of the nitrous acid generator 1 of this embodiment.

As illustrated in FIG. 4, the gas supplier 20 first supplies the gas containing oxygen and nitrogen into the liquid 80 (S10). Specifically, the gas supplier 20 supplies the gas into the liquid 80 held in the treatment vessel 70. More specifically, the gas supplier 20 supplies the gas into the liquid 80 such that the gas surrounds the second electrode 120 of the plasma generator 10. As a result, the gas bubble 21 is formed in the liquid 80 as illustrated in FIG. 2.

Then, the plasma generator 10 generates the plasma 22 in the gas bubble 21 formed in the liquid 80 (S20). Specifically, the power supply 140 generates a predetermined voltage between the first electrode 110 and the second electrode 120 such that electric discharge occurs in the gas bubble 21, and thus the plasma 22 is generated.

Then, the cooler 30 cools the liquid 80 (S30). Specifically, the cooler 30 cools the gas-liquid contact member 40, and thus the liquid 80 that has passed through the treatment vessel 70 and the pipe 50 is cooled while flowing through the gas-liquid contact member 40.

Then, the gas-liquid contact member 40 causes the nitrogen oxide produced by the plasma 22 to be dissolved in the liquid 80 (S40). Specifically, the liquid 80 containing the residual nitrogen oxide, which remains without dissolving in the liquid 80, is allowed to pass through the gas-liquid contact member 40. Thus, the nitrogen oxide dissolves in the liquid 80 while the liquid 80 is passing through the gas-liquid contact member 40.

In this embodiment, at least a part of the liquid 80 that has passed through the gas-liquid contact member 40 is returned to the treatment vessel 70. With this configuration, more highly concentrated nitrous acid can be produced.

The order of the steps indicated in FIG. 4 is an example and should not be limited thereto. The cooler 30 may cool the liquid 80 in the treatment vessel 70 before the supply of the gas (S10) and the generation of the plasma (S20), for example. Furthermore, the cooler 30 may always cool the liquid 80 in circulation.

3. Experimental Results

Hereinafter, results of experiments that were performed using the nitrous acid generator 1 of the embodiment are described with reference to FIG. 5 to FIG. 9B.

In the experiments described below, as a common condition of the experiments, the input power of the plasma generator 10 is 30 W. The liquid 80 is 300 ml of pure water.

3-1. Relationship Between Plasma Treatment and Nitrous Acid

Production of nitrogen oxide, i.e., production of nitrite ions, by plasma treatment using the nitrous acid generator 1 of the embodiment is described with reference to FIG. 5.

FIG. 5 indicates a relationship between plasma treatment duration and amount of nitrite ions in the nitrous acid generator 1 of the embodiment. In FIG. 5, the horizontal axis represents plasma treatment duration, or more specifically, the duration of the voltage applied between the first electrode 110 and the second electrode 120. The vertical axis represents nitrite ion concentration, or more specifically, amount of nitrite ions generated in the liquid 80. The amount of nitrite ions was determined by ion chromatography.

The "Example" in FIG. 5 indicates experimental results obtained by using the nitrous acid generator 1 of the embodiment. A pipe having an inner diameter of 4 mm and a length of 20 cm (ratio of the length of the tube to the inner diameter of the tube is 50) was used as a pipe that allows nitrogen oxide and liquid discharged from the treatment vessel to pass therethrough. The "Comparative Example" indicates experimental results obtained by using a nitrous acid generator that has the same configuration as the nitrous acid generator 1 of the embodiment except that the nitrous acid generator does not include the cooler 30 and the gas-liquid contact member 40. Every case satisfies the above-described general conditions such as the configuration of the plasma generator, for example.

As indicated in FIG. 5, in both of Example and Comparative Example, the amount of the nitrite ions increases as the plasma treatment duration increases. The amount of nitrite ions generated in Example is about eight times the amount of nitrite ions generated in Comparative Example.

It can be understood from the above that the highly concentrated nitrous acid is effectively produced by using the nitrous acid generator 1 of the embodiment.

3-2. Relationship Between Nitrous Acid and Hydrogen Peroxide

Next, decomposition of hydrogen peroxide ($H_2O_2$) by the nitrous acid produced by the nitrous acid generator 1 of the embodiment is described with reference to FIG. 6.

Figure 6:
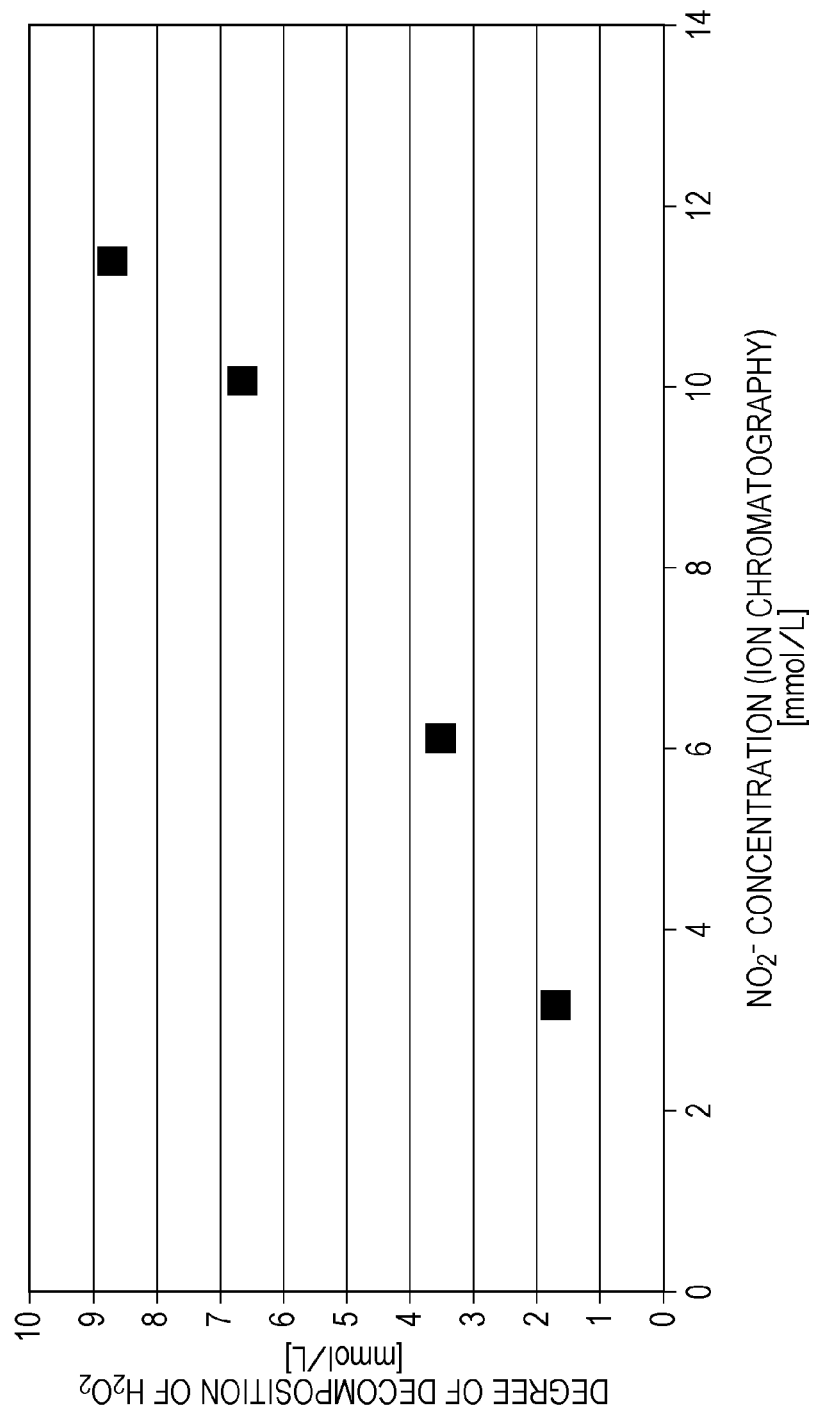
FIG. 6 is a diagram showing a relationship between nitrite ion concentration and degree of decomposition of hydrogen peroxide in the nitrous acid generator of the embodiment.

FIG. 6 indicates a relationship between nitrite ion concentration and degree of decomposition of hydrogen peroxide in the nitrous acid generator 1 of the embodiment. In FIG. 6, the horizontal axis represents nitrite ion concentration and the vertical axis represents the degree of decomposition of the hydrogen peroxide.

In the experiments, a part of the liquid 80 that has passed through the gas-liquid contact member 40 is taken out and brought into contact with hydrogen peroxide solution. The degree of decomposition of the hydrogen peroxide is determined by determining the hydrogen peroxide concentrations before the contact and after the contact. The nitrite ion concentration is determined by ion chromatography and the hydrogen peroxide concentration is determined by titration using potassium permanganate ($KMnO_4$).

As indicated in FIG. 6, degree of decomposition of the hydrogen peroxide increases as the nitrite ion concentration increases. Specifically, the ratio of the degree of decomposition of the hydrogen peroxide to the concentration of the nitrous acid produced by the nitrous acid generator 1 of the embodiment is about 1:1.4.

It is understood from the above that the nitrous acid causes the hydrogen peroxide to decompose. The nitrous acid generator 1 of the embodiment efficiently and quickly causes the hydrogen peroxide to decompose.

3-3. Gas to be Supplied and Produced Substance

Next, a relationship between a kind of a gas supplied by the gas supplier 20 and a substance produced by the gas is described with reference to FIG. 7A to FIG. 7C.

FIG. 7A indicates the relationship between discharge duration and the nitrite ion concentration according to each of three different gases supplied to the liquid 80 in the nitrous acid generator 1 of the embodiment. FIG. 7B indicates the relationship between discharge duration and the nitrate ion concentration according to each of three different gases supplied to the liquid 80 in the nitrous acid generator 1 of the embodiment. FIG. 7C indicates the relationship between discharge duration and the hydrogen peroxide concentration according to each of three different gases supplied to the liquid 80 in the nitrous acid generator 1 of the embodiment.

The horizontal axis in FIG. 7A to FIG. 7C represents discharge duration, i.e., plasma treatment duration, and the vertical axis in each of FIG. 7A to FIG. 7C represents the nitrite ion concentration, the nitrate ion concentration, and the hydrogen peroxide concentration, respectively. Concentrations were determined by the RQ flex method.

In the experiments, the gas supplier 20 supplied each of the three different gases to an area around the second electrode 120 at a flow rate of 0.2 L/min. In the pipes 50 and 51, the liquid 80 flowed at a flow rate of 0.5 L/min. The gas supplier 20 supplied air (atmospheric air containing oxygen and nitrogen), an oxide, or nitrogen as the gas.

As indicated in FIG. 7A, when the gas supplier 20 supplied the oxygen or the nitrogen, almost no nitrite ion was generated. When the gas supplier 20 supplied the atmospheric air, nitrite ions were generated. The amount of nitrite ions approaches the saturated point as the discharge duration increases.

Similarly, as indicated in FIG. 7B, when the gas supplier 20 supplied oxygen or nitrogen, almost no nitrate ion was generated. However, when the gas supplier 20 supplied air, nitrate ions were generated.

Furthermore, as indicated in FIG. 7C, when the gas supplier 20 supplied air, almost no hydrogen peroxide was produced. However, when the gas supplier 20 supplied oxygen, a large amount of the hydrogen peroxide was produced, and when the gas supplier 20 supplied nitrogen, hydrogen peroxide was produced.

It is understood from the above that air, i.e., the gas containing both nitrogen and the oxygen, needs to be supplied to generate nitrite ions. Since nitrate ions may be generated as a result of the generation of nitrite ions, the amount of nitrite ions is expected to increase if generation of the nitrate ions is suppressed. In the embodiment, the cooler 30 cools the liquid 80, for example, to increase the amount of nitrite ions.

3-4. Relationship Between Gas to be Supplied and Degree of Decomposition of Hydrogen Peroxide Next, a relationship between gas supplied by the gas supplier 20 and the degree of decomposition of hydrogen peroxide is described with reference to FIG. 8.

Figure 8:
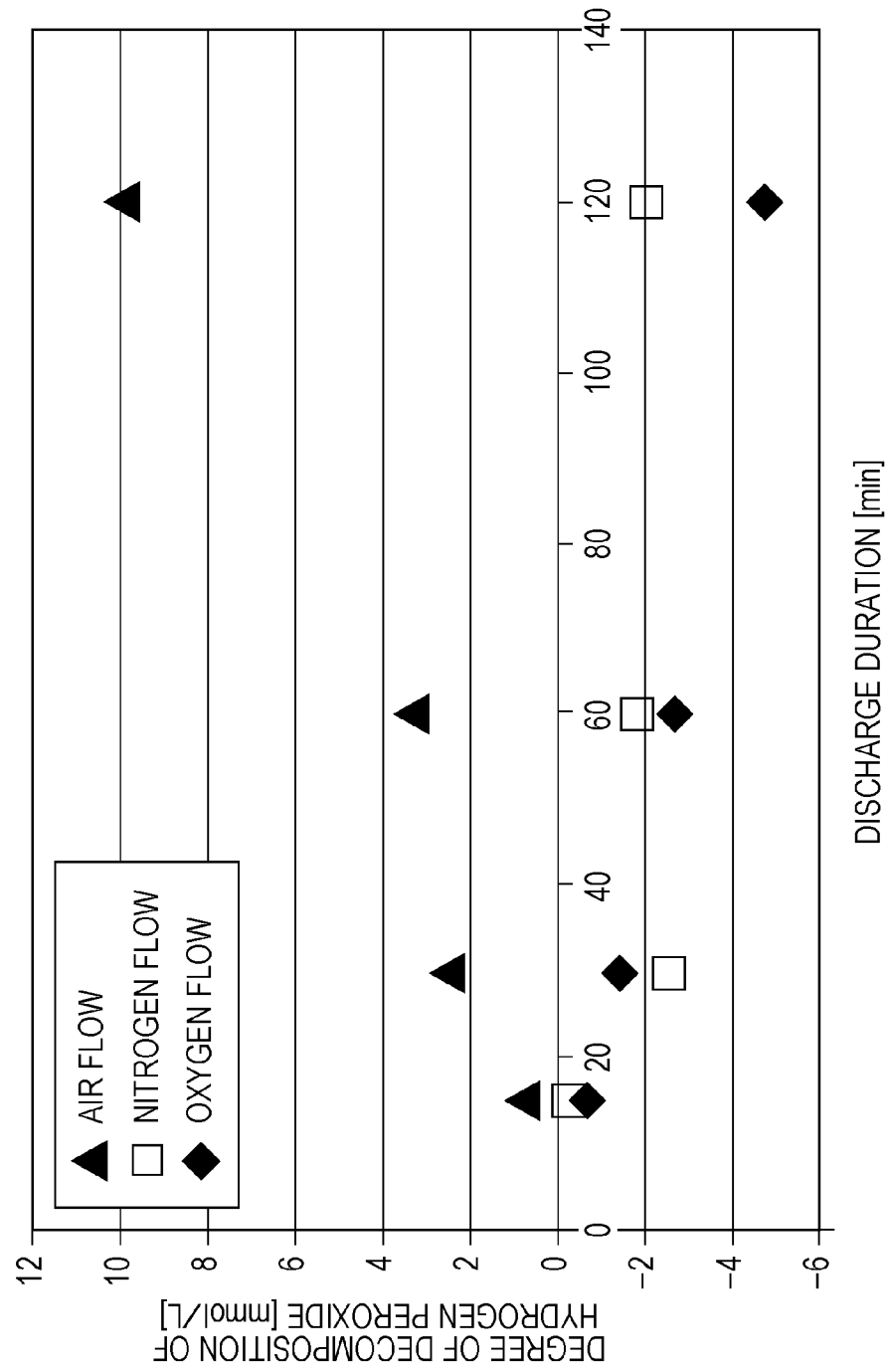
FIG. 8 is a diagram showing a relationship between discharge duration and degree of decomposition of hydrogen peroxide according to each of three different gases in the nitrous acid generator of the embodiment.

FIG. 8 indicates the relationship between discharge duration and the degree of decomposition of hydrogen peroxide according to each of the three different gases supplied in the liquid 80 in the nitrous acid generator 1 of the embodiment. In FIG. 8, the horizontal axis represents discharge duration and the vertical axis represents the degree of decomposition of the hydrogen peroxide. A negative degree of decomposition on the vertical axis indicates newly produced hydrogen peroxide.

The degree of decomposition of the hydrogen peroxide was measured in the same way as in FIG. 6. In addition, the supply condition of the gas by the gas supplier 20 was the same as that in FIG. 7A to FIG. 7C.

As indicated in FIG. 8, when the gas supplier 20 supplied the oxygen or the nitrogen, the hydrogen peroxide did not decompose, and new hydrogen peroxide was produced. The amount of hydrogen peroxide generated was larger when the oxygen was supplied than when the nitrogen was supplied. This result corresponds to the result shown in FIG. 7C.

When the gas supplier 20 supplied air, the hydrogen peroxide was decomposed. It can be understood from this and the result in FIG. 7A that the nitrite ions, which were generated in large amount, caused the hydrogen peroxide to decompose. In addition, the rate of decomposition was sufficiently high.

3-5. Concentrations of Nitrogen Monoxide and Nitrogen Dioxide Before and after Contact with Gas-Liquid Contact Member The concentrations of each of nitrogen monoxide and nitrogen dioxide remaining without dissolving in the liquid 80 were determined before and after contact of the liquid 80 with the gas-liquid contact member 40. The measurement results are described with reference to FIG. 9A and FIG. 9B.

Figure 9A:
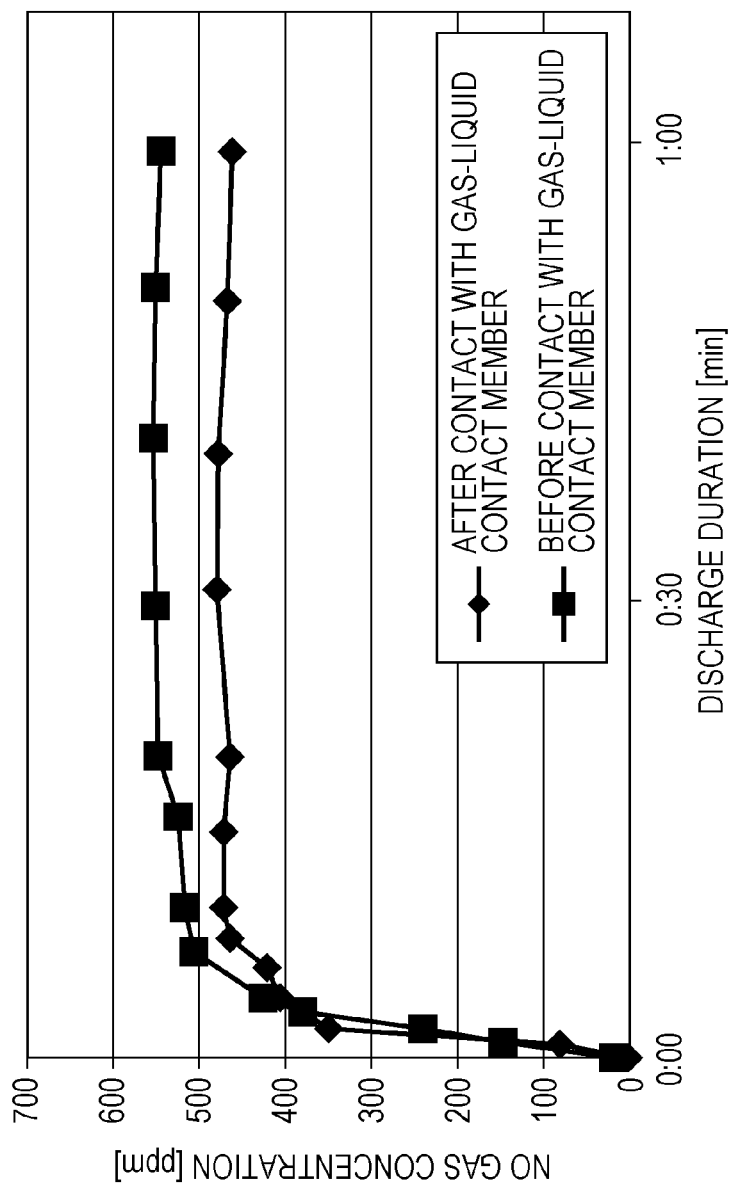
FIG. 9A is a diagram showing concentrations of residual nitrogen monoxide, which remains without dissolving in the liquid, before and after contact with the gas-liquid contact member in the nitrous acid generator of the embodiment.
Figure 9B:
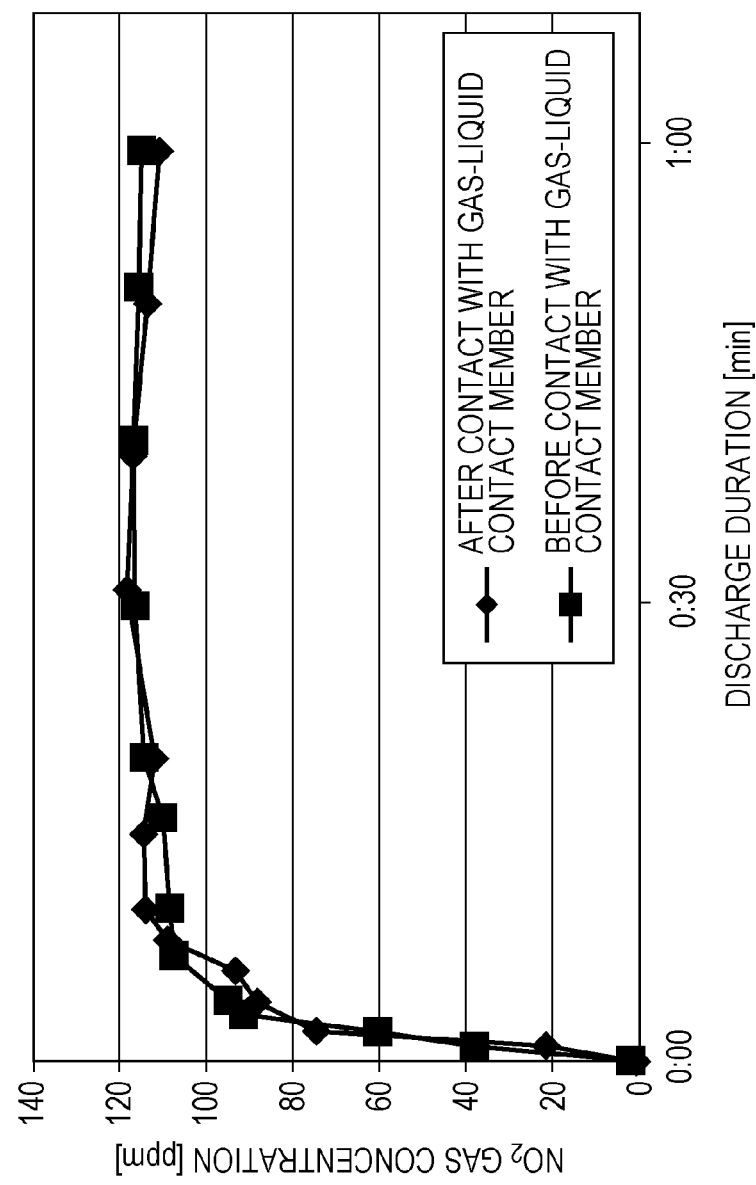
FIG. 9B is a diagram showing concentrations of residual nitrogen dioxide, which remains without dissolving in the liquid, before and after contact with the gas-liquid contact member in the nitrous acid generator of the embodiment.

FIG. 9A indicates the concentrations of the nitrogen monoxide remaining without dissolving in the liquid 80 in the nitrous acid generator 1 of the embodiment. FIG. 9B indicates the concentrations of the nitrogen dioxide remaining without dissolving in the liquid 80 in the nitrous acid generator 1 of the embodiment. In each case, a flow rate of air supplied by the gas supplier 20 was considered as 0.5 L/min. In each of FIG. 9A and FIG. 9B, the horizontal axis represents discharge duration of the plasma generator 10, i.e., plasma treatment duration, and the vertical axis represents the concentration of the nitrogen monoxide or the nitrogen dioxide remaining without dissolving in the liquid 80.

The liquid 80 before contact with the gas-liquid contact member 40, or more specifically, the liquid 80 flowing through the pipe 50, was removed and subjected to an infrared absorption analysis to determine the concentration of the remaining nitrogen monoxide and the remaining nitrogen dioxide. Furthermore, the liquid 80 after contact with the gas-liquid contact member 40, or more specifically, the liquid 80 flowing through the pipe 51, was removed and subjected to the infrared absorption analysis to determine the concentration of the remaining nitrogen monoxide and the remaining nitrogen dioxide.

As indicated in FIG. 9A, when the discharge duration is one hour, for example, the concentration of the nitrogen monoxide is 545 ppm before the contact and 461 ppm after the contact. In other words, 84 ppm of the nitrogen monoxide was dissolved in the liquid 80. It can be understood that 15% or more of the nitrogen monoxide before the contact was dissolved in the liquid 80.

As indicated in FIG. 9B, when the discharge duration is one hour, for example, the concentration of the nitrogen dioxide is 115 ppm before the contact and 110 ppm after the contact. In other words, 5 ppm of the nitrogen dioxide was dissolved in the liquid 80. It can be understood that 4% or more of the nitrogen dioxide before the contact was dissolved in the liquid 80.

It can be understood that 13% or more of the nitrogen monoxide and the nitrogen dioxide was dissolved in the liquid 80 by the gas-liquid contact member 40.

It is understood from the above that the gas-liquid contact member 40 causes the nitrogen monoxide and the nitrogen dioxide to be dissolved efficiently in the liquid 80. The highly concentrated nitrous acid is produced efficiently due to the gas-liquid contact member 40.

4. Conclusion

As described above, the nitrous acid generator 1 of this embodiment includes the gas supplier 20, the plasma generator 10, the gas-liquid contact member 40, and the cooler 30. The gas supplier 20 supplies the gas containing oxygen and nitrogen to the liquid 80 to form the gas bubble 21. The plasma generator 10 generates the plasma 22 in the gas bubble 21 formed by the gas supplier 20 to produce the nitrogen oxide consisting of at least nitrogen monoxide and nitrogen dioxide. The gas-liquid contact member 40 allows the liquid 80 after the generation of the plasma to pass therethrough such that the nitrogen oxide produced in the liquid 80 dissolves in the liquid 80. The cooler 30 cools the liquid 80 passing through the gas-liquid contact member 40.

With this configuration, the plasma 22 is generated in the gas bubble 21 formed in the liquid 80, and thus the nitrogen oxide is produced in the bubble. The nitrogen oxide produced in the bubble is surrounded by the liquid 80. Thus, the nitrogen oxide concentration increases due to the pressure of the liquid 80 surrounding the nitrogen oxide, and thus the nitrogen oxide dissolves efficiently in the liquid 80. In addition, since the nitrous acid generator 1 of the embodiment includes the gas-liquid contact member 40, the nitrogen oxide dissolves more efficiently in the liquid 80.

When the nitrogen oxide dissolves in the liquid 80, nitrite ions are generated. However, nitrite ions readily convert to the nitrate ions at high temperatures. In the embodiment, the cooler 30 reduces the likelihood that the nitrite ions will be converted to the nitrate ions. Thus, in the embodiment, the highly concentrated nitrous acid is produced efficiently.

First Modification

Hereinafter, a nitrous acid generator of a first modification of the above-described embodiment is described with reference to FIG. 10. FIG. 10 illustrates a configuration of a nitrous acid generator 2 of the first modification.

As illustrated in FIG. 10, the nitrous acid generator 2 of the first modification includes a gas collection pipe 62 instead of the gas outlet pipe 61 in the nitrous acid generator 1 of the embodiment illustrated in FIG. 1. In the following description, the component that has a different configuration from that in the above-described embodiment is mainly described.

The gas collection pipe 62 collects the residual nitrogen oxide, which remains in the liquid 80 passed through the gas-liquid contact member 40 without dissolving in the liquid 80, and allows the collected nitrogen oxide to return to the gas supplier 20. The gas collection pipe 62 is connected to the gas-liquid contact member 40 and the gas supplier 20. The nitrogen oxide returned to the gas supplier 20 through the gas collection pipe 62 is supplied again to the liquid 80 through the gas inlet pipe 60 with the oxygen and the nitrogen. The gas collection pipe 62 may be made of the same material as the gas outlet pipe 61, for example.

As described above, in the nitrous acid generator 2 of the first modification, the residual nitrogen oxide, which remains in the liquid 80 passed through the gas-liquid contact member 40 without dissolving in the liquid 80, is collected and the gas supplier 20 supplies the collected nitrogen oxide to the liquid 80 with the gas.

With this configuration, the nitrogen oxide remaining without dissolving in the liquid 80 is collected and the gas supplier 20 supplies the collected nitrogen oxide to the liquid 80. This increases the opportunity for the nitrogen oxide to dissolve in the liquid, and thus the highly concentrated nitrous acid can be produced efficiently.

Second Modification

Figure 11:
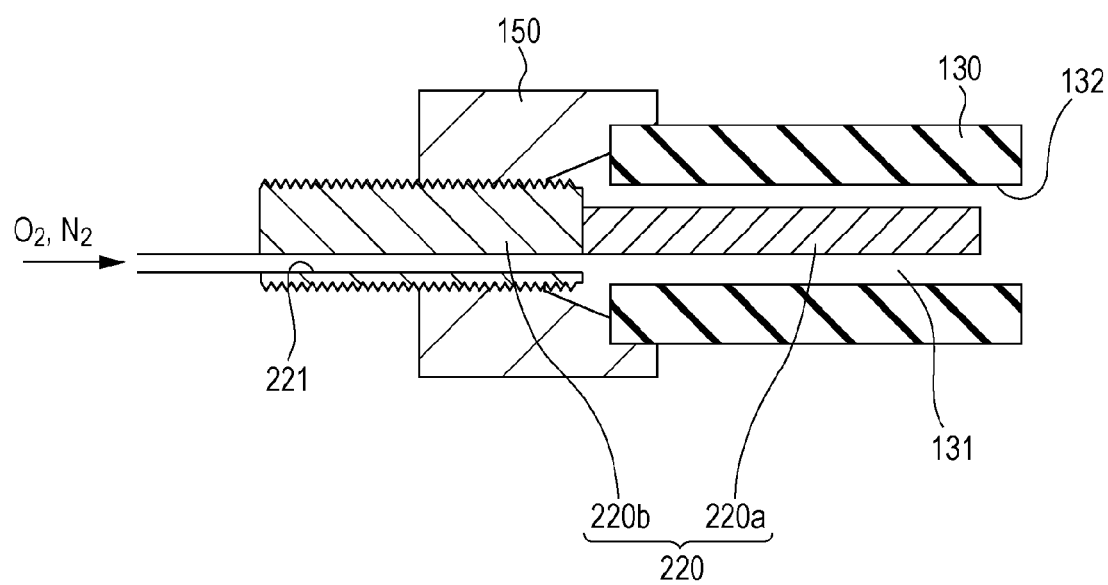
FIG. 11 is a view illustrating a configuration of an electrode of a plasma generator in a second modification of the embodiment.

Hereinafter, a nitrous acid generator of a second modification of the embodiment is described with reference to FIG. 11. FIG. 11 illustrates a configuration of an electrode of the plasma generator 10 of the second modification.

In the second modification, the electrode of the plasma generator 10 has a configuration different from that of the nitrous acid generator 1 in the embodiment. Specifically, as illustrated in FIG. 11, the plasma generator of the second modification includes a second electrode 220 instead of the second electrode 120 illustrated in FIG. 2. In the following description, the component that has a different configuration from that in the above-described embodiment is mainly described.

The second electrode 220 includes a metal electrode portion 220a and a metal screw 220b.

The metal electrode portion 220a is a cylindrical metal electrode, for example. The diameter of the metal electrode portion 220a is 2 mm or less, for example, and is 0.95 mm as an example.

The metal electrode portion 220a is surrounded by the insulator 130. The metal electrode portion 220a and the insulator 130 define the gap 131 therebetween.

The metal electrode portion 220a has one end (tip) that is positioned so as to be in contact with the liquid 80 and has the other end (base) that is press-fitted into the metal screw 220b. The metal electrode portion 220a does not protrude from the opening 132 of the insulator 130.

The metal electrode portion 220a is used as a reaction electrode and the plasma 22 is generated around it. The metal electrode portion 220a may be made of the same material as the second electrode 120, for example.

The metal screw 220b is a bar-like member, for example. Specifically, the metal screw 220b is a cylindrical member. The diameter of the metal screw 220b is larger than that of the metal electrode portion 220a, for example, and is 3 mm as an example.

The metal screw 220b is made of iron, for example. The metal screw 220b may be made of any material that is used as a material of typical screws. The metal screw 220b may be made of copper, zinc, aluminum, tin, or brass. The metal screw 220b and the metal electrode portion 220a may be made of the same material and may have the same size. In other words, the second electrode 220 may be one cylindrical member.

The metal screw 220b has a through hole 221 and is connected to the gas supplier 20 through the through hole 221. The through hole 221 extends through the metal screw 220b in the axial direction.

The through hole 221 is in communication with the gap 131. The gas from the gas supplier 20 is supplied to the gap 131 through the through hole 221. The gas supplied to the gap 131 is expelled through the opening 132. The through hole 221 has a diameter of 0.3 mm, for example.

The metal screw 220b may have a threaded portion on the outer surface. The threaded portion may be an external thread that mates with a threaded portion of the holding block 150.

In the second modification, the insulator 130 and the holding block 150 have configurations substantially the same as those in the embodiment, but may have configurations different from those in the embodiment. The insulator 130 in the second modification may have a shape corresponding to the diameter of the metal electrode portion 220a, for example. When the diameter of the metal electrode portion 220a is smaller than the diameter of the second electrode 120 of the embodiment, the shape of the insulator 130 may be changed such that the dimension of the gap 131 becomes the same as that in the embodiment.

Other Embodiments

The nitrous acid generators and the method of generating nitrous acid according to one or more aspects are described above based on the embodiment and the modifications, but the present disclosure should not be limited thereto. Any modification that is apparent to a person skilled in the art and any combination of the components in the embodiment and the modifications may be within the scope of the present disclosure without departing from the spirit of the present disclosure.

In the above-described embodiment, the liquid 80 may not be circulated, for example. Specifically, the pipe 51 may not be connected to the inlet of the treatment vessel 70. The liquid 80 that has passed through the gas-liquid contact member 40 may not return to the treatment vessel 70 and may be used for decomposition of the hydrogen peroxide, for example.

Other various modifications, substitutions, additions, or omissions may be performed on the embodiment within or equivalent to the scope of the claims.

The present disclosure is widely applicable to the nitrous acid generator that efficiently generates highly concentrated nitrous acid and the method of generating nitrous acid. The present disclosure may be used for decomposition of hydrogen peroxide, for example.

What is claimed is:

1. A nitrous acid generator comprising:
    a treatment vessel having an inner space being capable of holding a liquid;
    a gas supplier supplying a gas to the inner space such that the gas forms a bubble in the liquid, the gas containing oxygen and nitrogen;
    a plasma generator including a first electrode, a second electrode, and a power supply for applying a voltage between the first electrode and the second electrode, the plasma generator generating plasma in the bubble, the plasma producing nitrogen oxide;
    a gas-liquid contact member to which the nitrogen oxide and the liquid are introduced from the treatment vessel, the gas-liquid contact member including a tube arranged such that both the nitrogen oxide and the liquid flow therethrough, a ratio of a length of the tube to an inner diameter of the tube being 50 or more, the tube being configured so as to cause the nitrogen oxide to be dissolved in the liquid such that a volume of the nitrogen oxide in the liquid exiting the tube is less than a volume of the nitrogen oxide in the liquid entering the tube;
    a cooler cooling the nitrogen oxide and the liquid flowing through the tube; and
    a pipe connecting the gas-liquid contact member and the gas supplier,
    wherein the gas supplier supplies the gas containing a part of the nitrogen oxide not dissolved in the liquid in the gas-liquid contact member, and
    the part of the nitrogen oxide being introduced to the gas supplier through the pipe.

2. The nitrous acid generator according to claim 1, further comprising a pump that moves the nitrogen oxide and the liquid in the treatment vessel to the gas-liquid contact member.

3. The nitrous acid generator according to claim 1, further comprising a pump that returns at least a part of the liquid passed through the gas-liquid contact member to the treatment vessel.

4. The nitrous acid generator according to claim 1, wherein
    the treatment vessel has a bottom wall, and has a wall facing the inner space and having an opening,
    the second electrode is connected to the gas supplier,
    the nitrogen oxide and the liquid are introduced from the treatment vessel to the gas-liquid contact member through the opening, and
    the opening is farther from the bottom wall than the second electrode in a vertical direction of the treatment vessel.

5. The nitrous acid generator according to claim 4, wherein
    the wall further has a top wall, and a side wall between the bottom wall and the top wall, and
    the side wall has the opening.

6. The nitrous acid generator according to claim 1, wherein the nitrogen oxide includes nitrogen monoxide and nitrogen dioxide.

7. The nitrous acid generator according to claim 1, wherein a flow rate of the gas supplied to the inner space by the gas supplier is equal to or less than a flow rate of the liquid supplied to the inner space.

8. The nitrous acid generator according to claim 1, wherein the tube is wound into a roll.

9. A nitrous acid generator comprising:
    a treatment vessel having an inner space being capable of holding a liquid, the treatment vessel having a bottom wall and having a wall that faces the inner space and has an opening;
    a gas supplier supplying a gas to the inner space such that the gas forms a bubble in the liquid, the gas containing oxygen and nitrogen;
    a plasma generator including a first electrode, a second electrode connected to the gas supplier, and a power supply for applying a voltage between the first electrode and the second electrode, the plasma generator generating plasma in the bubble, the plasma producing nitrogen oxide;
    a gas-liquid contact member to which the nitrogen oxide and the liquid are introduced from the treatment vessel through the opening, the gas-liquid contact member including a tube arranged such that both the nitrogen oxide and the liquid flow therethrough, a ratio of a length of the tube to an inner diameter of the tube being 50 or more, the tube being configured so as to cause the nitrogen oxide to be dissolved in the liquid such that a volume of the nitrogen oxide in the liquid exiting the tube is less than a volume of the nitrogen oxide in the liquid entering the tube; and
    a cooler cooling the nitrogen oxide and the liquid flowing through the tube, wherein the opening is farther from the bottom wall than the second electrode in a vertical direction of the treatment vessel.

10. The nitrous acid generator according to claim 9, wherein the wall further has a top wall, and a side wall between the bottom wall and the top wall, and
the side wall has the opening.

11. The nitrous acid generator according to claim 9, further comprising:
a first pipe connecting the treatment vessel and the gas-liquid contact member,
wherein the nitrogen oxide and the liquid in the treatment vessel are introduced to the gas-liquid contact member through the opening and the first pipe.

12. The nitrous acid generator according to claim 11, further comprising:
a second pipe connecting the treatment vessel and the gas-liquid contact member,
wherein at least a part of the liquid in the gas-liquid contact member is returned to the treatment vessel through the second pipe.

13. The nitrous acid generator according to claim 11, further comprising a pump that moves the nitrogen oxide and the liquid in the treatment vessel to the gas-liquid contact member through the opening and the first pipe.

14. The nitrous acid generator according to claim 12, further comprising a pump that returns at least a part of the liquid passed through the gas-liquid contact member to the treatment vessel through the second pipe.

15. The nitrous acid generator according to claim 9, wherein the nitrogen oxide includes nitrogen monoxide and nitrogen dioxide.

16. The nitrous acid generator according to claim 9, wherein a flow rate of the gas supplied to the inner space by the gas supplier is equal to or less than a flow rate of the liquid supplied to the inner space.

17. The nitrous acid generator according to claim 9, wherein the tube is wound into a roll.

* * * * *